Figure 1:
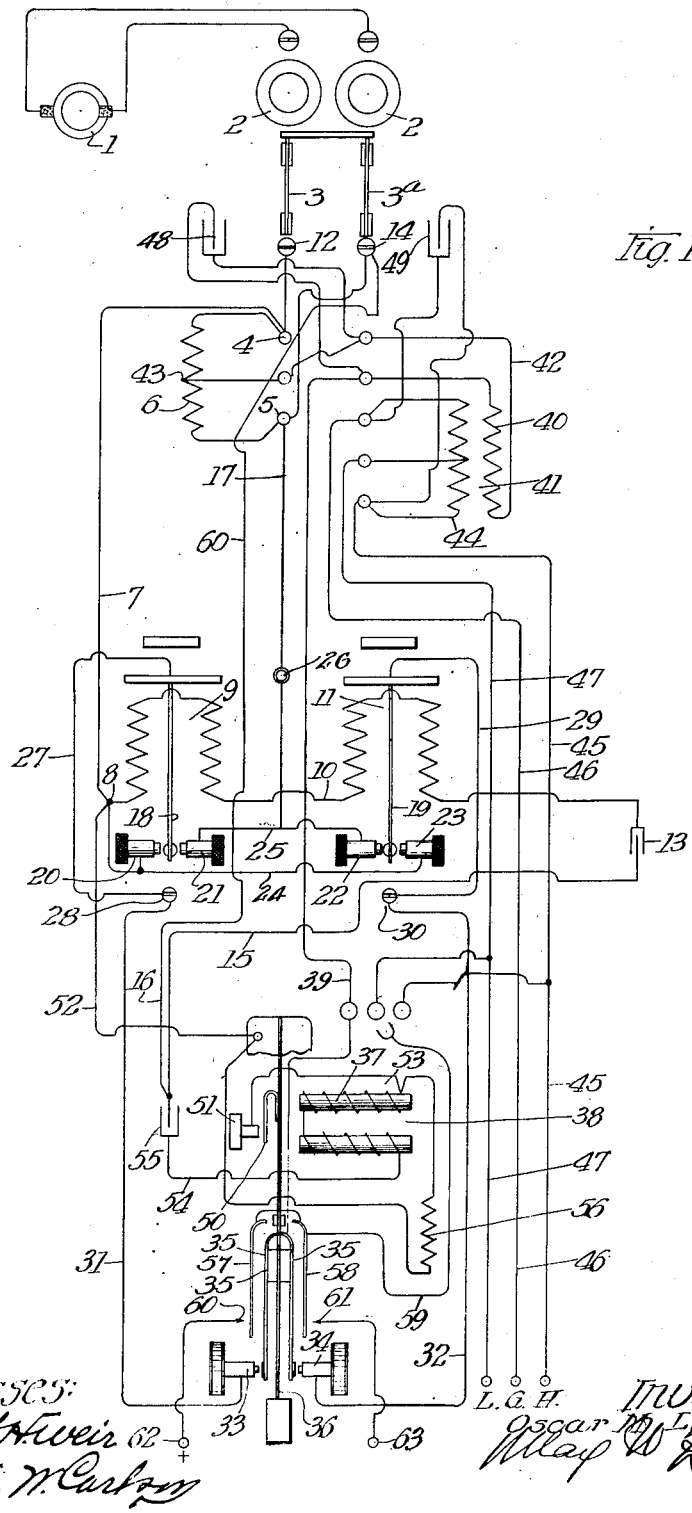

O. M. LEICH.
VIBRATORY CONVERTER.
APPLICATION FILED SEPT. 28, 1915.

1,288,935.

Patented Dec. 24, 1918.

UNITED STATES PATENT OFFICE.

OSCAR M. LEICH, OF GENOA, ILLINOIS, ASSIGNOR TO LEICH ELECTRIC COMPANY, OF GENOA, ILLINOIS.

VIBRATORY CONVERTER.

1,288,935.  Specification of Letters Patent.  Patented Dec. 24, 1918.

Application filed September 28, 1915. Serial No. 52,996.

*To all whom it may concern:*

Be it known that I, OSCAR M. LEICH, a citizen of the United States, residing at Genoa, in the county of Dekalb and State of Illinois, have invented a certain new and useful Improvement in Vibratory Converters, of which the following is a full, clear, concise, and exact description, reference being had to the accompanying drawings, forming a part of this specification.

My invention relates to vibratory converters, and has for its object the provision of an improved converter of this kind which is an improvement more particularly of my co-pending application Serial No. 16,564, filed March 24, 1915. My invention contemplates in its general form the provision of a mechanism which can be supplied with alternating current, change this alternating current into uni-directional current, and then modify this uni-directional current into an alternating current of different frequency than the impressed alternating current.

In my application Serial No. 98,266 filed May 18, 1916 which is a divisional application of the aforesaid application Serial No. 16,564, I have claimed broadly a system as just set forth, reserving for this present application the claims directed to a system in which the device is enabled to deliver pulsating current. In my copending application Serial No. 169,637 I show and claim certain means applied to a system of the general nature set forth above for protecting the vibrators from the harmful influences of excessive current flow.

In a specific form in which my invention finds much application, such as providing ringing mechanism for telephone exchanges, this mechanism may be directly connected to the commercial form of alternating current, and will transform this current into alternating current of a suitable frequency for ringing purposes, varying for instance from 16 to 30 cycles per second.

The particular object of my present invention is to provide a device of this kind in which I am enabled not only to supply alternating currents of a frequency other than those of the impressed current, but also am enabled to furnish pulsating positive or negative current as may be required in devices of this kind.

In illustrating my invention I have chosen this particular form, and it is this particular form I will now describe in connection with the accompanying drawing illustrating such form, in which—

Figure 1 illustrates diagrammatically my improved device.

Referring more particularly to Fig. 1, I show a source of alternating current 1 which is led through fuses 2 by means of the switch bars 3 and 3ᵃ to terminals 12 and 14. To terminal 12 is connected terminal 4 of the impedance coil 6, and terminal 14 is connected to terminal 5 of the impedance coil 6. This circuit also extends from the binding post 4 by means of the conductor 7, to one terminal 8 of a vibrator 9, the current then extending through the coils of said vibrator by means of conductor 10, through the coils of the twin vibrator 11, condenser 13, conductor 15, conductor 16, conductor 60, to the terminal 14. Twin vibrators 9 and 11 are thus also connected directly across the circuit from the generator 1. These twin vibrators 9 and 11 vibrate their armatures and consequently the arms 18 and 19 respectively in accordance with the frequency of the current supplied by the generator 1, the element 13 serving to cause the current breaks due to these vibrations to occur at the proper time, that is, when the current is passing through its zero point. The arm 18 coöperates respectively with the contacts 20 and 21, and the arm 19 coöperates respectively with the contacts 22 and 23. The contacts 20 and 23 are connected together by means of the conductor 24, and then extend by way of conductor 7 to the terminal 4, which is one side of the impressed circuit. The contacts 21 and 22 are connected together by means of a conductor 25, then by means of conductor 17 to the contact 5, which conductor 17 includes the resistance 26.

The resistance 26 prevents the flow of a too large current to the vibratory elements 18 and 19 and their coöperating contacts. It has been found in the operation of a vibrator that at times there may be some inequalities in the operation of the arms 18 and 19, these arms being momentarily out of step, thus making a momentary wrongful contact. Under these circumstances a too large flow of current would cause the welding of the contacts and destroy the effectiveness of the instrument. The resistance 26 guards against this contingency.

The contact 5 represents the other side of the impressed circuit. The arm 18 is connected by means of conductor 27 with the contact terminal 28, and the arm 19 is connected by means of conductor 29 to the contact terminal 30.

We thus have at the contact terminals 28 and 30 a uni-directional current as the arms 18 and 19 vibrate in accordance with the frequency of the impressed current, and thus keep the terminals 28 and 30 positive and negative respectively. These terminals 28 and 30 are then connected by means of conductors 31 and 32 respectively to the contact posts 33 and 34. These contact posts are in association with spring contacts 35, 35, carried by a vibrating rod 36 which is operable by the electromagnet 37 of the vibrator 38. The arms 35 are connected together and extend by means of conductor 39 to one terminal of a primary winding 40 of the transformer 41, the other terminal of this primary winding being connected by means of conductor 42 with a central point 43 of the impedance winding 6.

It will be noted that as the arms 18 and 19 vibrate in synchronism with the impressed alternating current, that the binding posts 28 and 30 to which they are respectively connected are maintained relatively one at a positive potential and the other at a negative potential. The binding posts thus represent the terminals of a continuous current system. The binding posts 28 and 30 are alternately connected each to each to the binding posts 4 and 5 representing the opposite sides of the alternator 1. The primary winding 40 has one terminal connected to a point of neutral potential relative to the potential of the binding posts 28 and 30, by means of a conductor 43. The remaining terminal of the primary winding 40 is through the agency of the conductor 39 and vibratory contact 35 connected alternately to the contact 33 and 36 (which are connected respectively to the binding posts 28 and 30) so that this terminal of the winding is alternately of positive and negative potential relatively to its other terminal which is of relatively neutral potential. Thus we have alternating current established in the primary winding 40 of a frequency corresponding to the vibrations of the vibratory arm 36. It will of course be understood that the vibrators of the arm 36 have a frequency dependent upon the particular rate of vibration of this spring arm 36 as modified by the position of the weight and the size of the weight as shown at the extremity of this arm 36. Even though alternating current is passing through the coils 37 that of course would not control the frequency of vibration inasmuch as the vibrator 38 is not polarized and inasmuch as it depends for its vibration upon the making and breaking of the circuit by means of the contacts 50 and 51. The spring characteristics of the arm 36 and the weight, however, are strong enough so as to be controlling as to the frequency, this being well understood in the art.

It is further pointed out that the statement "that there is alternating current in the winding 40" must be understood to mean that this alternating current has a fundamental frequency equal to the frequency of vibration of the arm 36. There of course may be small changes and fluctuations in the current of each wave so that the wave is not a true sine wave, these breaks being of a frequency corresponding to the frequency of the alternator 1, but what I might call the fundamental frequency is the frequency corresponding to the frequency of the arm 36.

It is also pointed out that I find a great advantage in the use of twin vibrators over the use of merely one vibrator. Of course, one vibrator will accomplish the result set out, but not in as effective a way as the two vibrators in that with the use of the twin vibrators it is not necessary to use a double wound primary winding for the transformer 41.

To explain more in detail the advantages due to the use of twin vibrators, I may say that in case one vibrator is used having two contacts that then there is a necessity for using oppositely wound windings in the primary of the transformer. These windings are always difficult to produce, it requiring these wires to be wound in parallel in order to obtain the same magnetizing effect and even then difficulty is very frequently experienced unless the greatest minutest care is exercised. For these reasons it is desirable to avoid the necessity of such minutely accurate construction which unnecessarily increases the cost. Should one vibrator be used with four contacts instead of two so as to avoid the necessity of primary windings then a greater difficulty is met in that it is impossible with the rapid rate of vibration to position four contacts so that two of them will always be simultaneously and instantaneously in association with the vibrator elements. The movement of the vibratory element is very small and the slightest inaccuracy of adjustment or warping of the parts would cause injurious operation. It is therefore desirable to have but two oppositely disposed contacts. For these reasons the twin vibrators even though seemingly representing additional equipment, in fact, reduce the cost of the equipment necessary to produce the given result.

A secondary winding 44 is in inductive relation with the primary winding 40 and furnishes its full voltage to the conductors 45 and 46. A conductor 47 is taken from an intermediate portion of the secondary winding 44 so that the conductor marked G may represent the conductor that is always used from this secondary winding for the local circuit, and the conductors marked L and H can be used for a low or high voltage as desired. The terminals of the primary winding 40 are bridged by the condenser 48 to smooth out the wave, and the terminals of the secondary winding are bridged by the condenser 49 for a similar purpose. The vibrator 38 has a contact spring 50 which coöperates with the stationary contact 51. The current to operate the vibrator 38 is furnished from the main circuit supplied by the generator 1, and can be traced from the binding post 4, via conductor 7, conductor 52, arm 36, contact elements 50 and 51, conductor 53, coils 37, conductor 54, condenser 55, conductor 16, to the terminal 14. Whenever the arm 36 is attracted and circuit through the elements 50 and 51 broken, the circuit is not entirely broken through the coils 37 as they are still included with the resistance 56, but that does not energize them sufficiently to prevent retraction of the armature 36.

The vibrator 38 carries an additional pair of springs 57 and 58 which are connected together, and connected by means of the conductor 59 with either the high voltage conductor 45 or the low voltage conductor 47, depending upon whether a high voltage pulsating current is wanted, or a low voltage pulsating current is wanted. These conductors 57 and 58 coöperate respectively with contact posts 60 and 61 to thus furnish current of a positive nature to the terminal 62 and of a negative character to the terminal 63. Either the terminal 62 or 63 is then used in connection with the conductor 46 as the other conductor of the circuit. The vibrator 38 it will be seen serves for the same purpose to determine the frequency of the current supplied to the transformer 41 and at the same time serves to pick out the positive waves and negative waves, thus insuring positive synchronism.

From what has been described the nature of my invention will be readily clear to those skilled in the art, and it will also be clear that my invention is susceptible of modifications within the scope of the appended claims.

Having however thus described one form of my invention, what I claim as new and desire to secure by Letters Patent is:

1. A system of the character described comprising a vibrator, means whereby said vibrator converts uni-directional current into alternating current, and means operated by said vibrator for transforming said alternating current into pulsating current, a source of alternating current, and a pair of twin vibrators having means to furnish uni-directional current from said source to said first aforesaid vibrator.

2. A system of the character described comprising a vibrator, means whereby said vibrator converts uni-directional current into alternating current, means operated by said vibrator for transforming said alternating current into pulsating current of either sign, a source of alternating current, and a pair of twin vibrators having means to furnish uni-directional current from said source to said first aforesaid vibrator.

3. In a device of the character described the combination with a vibrator, contacts operated by said vibrator for transforming uni-directional current into alternating current, a transformer primary receiving said alternating current, a secondary therefor, means operated by said vibrator to transform said alternating current into pulsating current, a source of alternating current, and a pair of twin vibrators having means to furnish uni-directional current from said source to said first aforesaid vibrator.

4. In a device of the character described the combination with a vibrator, contacts operated by said vibrator for transforming uni-directional current into alternating current, a transformer primary receiving said alternating current, a secondary therefor, means operated by said vibrator to transform said alternating current into pulsating current of either sign, a source of alternating current, and a pair of twin vibrators having means to furnish uni-directional current from said source to said first aforesaid vibrator.

5. In a selective frequency signaling system, the combination of an alternating current source of supply, a signaling circuit, a vibratory rectifier for changing the alternating current to a pulsatory uni-directional current, and a vibratory electromagnetically operated means connected to feed said rectified current to said signaling circuit at a fundamental rate of pulsation different from the rate of pulsation of said rectified current, said vibratory electromagnetically operated means having means to change said pulsatory uni-directional current either into alternating current or pulsating current.

6. In a selective frequency signaling system, the combination of an alternating current source of supply, a signaling circuit, a vibratory rectifier for changing the alternating current to a pulsatory uni-directional current, and a vibratory electromagnetically operated means excited from the alternating current source of supply connected to feed said rectified current to said signaling circuit at a fundamental rate of pulsation different from the rate of pulsation of said rectified current, said vibratory electromagnetically operated means having means to change said pulsatory uni-directional current either into alternating current or pulsating current.

7. In a selective frequency signaling system, the combination of an alternating current source of supply, a signaling circuit, a vibratory rectifier for changing the alternating current to a pulsatory uni-directional current, a vibratory electromagnetically operated means connected to feed said rectified current to said signaling circuit at a fundamental rate of pulsation different from the rate of pulsation of said rectified current, said vibratory electromagnetically operated means having means to change said pulsatory uni-directional current either into alternating current or pulsating current, and a transformer interposed between said vibratory electromagnetically operated means and said signaling circuit.

8. In a selective frequency signaling system, the combination of an alternating current source of supply, a signaling circuit, a vibratory rectifier for changing the alternating current to a pulsatory uni-directional current, a vibratory electromagnetically operated means excited from the alternating current source of supply connected to feed said rectified current to said signaling circuit at a fundamental rate of pulsation different from the rate of pulsation of said rectified current, said vibratory electromagnetically operated means having means to change said pulsatory uni-directional current either into alternating current or pulsating current, and a transformer interposed between said vibratory electromagnetically operated means and said signaling circuit.

In witness whereof, I hereunto subscribe my name this 24th day of September, A. D. 1915.

OSCAR M. LEICH.

Witnesses:
 HAZEL A. JONES,
 O. M. WERMICH.